(12) United States Patent
Fischer

(10) Patent No.: US 10,259,926 B2
(45) Date of Patent: Apr. 16, 2019

(54) ZEOLITES FOR THERMOPLASTIC FOAM INJECTION MOLDING

(71) Applicant: Lisa Draexlmaier GmbH, Vilsbiburg (DE)

(72) Inventor: Wolfgang Fischer, Dorfen (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 0 days.

(21) Appl. No.: 15/147,386

(22) Filed: May 5, 2016

(65) Prior Publication Data

US 2016/0326329 A1  Nov. 10, 2016

(30) Foreign Application Priority Data

May 5, 2015 (DE) .................. 10 2015 106 990

(51) Int. Cl.
*C08J 9/00* (2006.01)
*C08J 9/36* (2006.01)
*C08J 9/12* (2006.01)

(52) U.S. Cl.
CPC ............ *C08J 9/365* (2013.01); *C08J 9/0066* (2013.01); *C08J 9/125* (2013.01); C08J 2201/03 (2013.01); C08J 2205/042 (2013.01); C08J 2323/06 (2013.01); C08J 2323/12 (2013.01); C08J 2325/06 (2013.01); C08J 2325/12 (2013.01); C08J 2327/06 (2013.01); C08J 2355/02 (2013.01); C08J 2369/00 (2013.01); *C08J 2377/00* (2013.01)

(58) Field of Classification Search
CPC . C08J 9/0066; C08J 9/365; C08J 9/125; C08J 2201/03; C08J 2325/12; C08J 2325/06; C08J 2369/00; C08J 2323/06; C08J 2323/12; C08J 2327/06; C08J 2377/00; C08J 2205/042; C08J 2355/02; C08J 2369/2323; C08J 2369/06
See application file for complete search history.

(56) References Cited

U.S. PATENT DOCUMENTS

| 3,072,583 | A | | 1/1963 | Randa | |
|---|---|---|---|---|---|
| 4,049,760 | A | * | 9/1977 | Lozach | B29C 47/8815 264/210.2 |
| 4,877,815 | A | | 10/1989 | Buckmaster et al. | |
| 5,115,002 | A | * | 5/1992 | Van Helden et al. | C08K 3/34 524/338 |
| 5,298,234 | A | * | 3/1994 | Nakazawa et al. | C08K 9/02 106/286.5 |
| 5,726,214 | A | | 3/1998 | Buckmaster et al. | |
| 6,528,570 | B1 | | 3/2003 | Berghmans et al. | |
| 2006/0074154 | A1 | * | 4/2006 | Harashina et al. | C08K 5/51 524/115 |
| 2006/0205831 | A1 | * | 9/2006 | Reedy | C08G 18/0885 521/131 |
| 2010/0152352 | A1 | * | 6/2010 | Barber et al. | C08K 3/0058 524/296 |
| 2012/0225291 | A1 | * | 9/2012 | Karayianni | C08L 67/025 428/375 |

FOREIGN PATENT DOCUMENTS

| DE | 4129950 A1 | 3/1993 |
|---|---|---|
| DE | 19610330 A1 | 9/1997 |
| DE | 60008646 T2 | 2/2005 |
| DE | 60219054 T2 | 12/2007 |
| JP | 08-012796 A | 1/1996 |

OTHER PUBLICATIONS

Hefferan, K. et al., "Earth materials", Wiley-Blackwell, 2010, p. 139.
Klein, C., et al., "Earth materials", Cambridge University Press 2013, pp. 386-387 and 462.

* cited by examiner

*Primary Examiner* — Nathan M Nutter
(74) *Attorney, Agent, or Firm* — Finnegan, Henderson, Farabow, Garrett & Dunner, LLP

(57) ABSTRACT

Embodiments disclose a foamed, flame-proofed molded body, comprising at least one thermoplastic polymer including a zeolite material in an amount from 0.1 percent by mass to 5.0 percent by mass, based on the weight of the foamed polymer, wherein the thermoplastic polymer is selected from the group consisting of acrylonitrile butadiene styrene (ABS), styrene acrylonitrile (SAN), polystyrene (PS), polycarbonate (PC), polyethylene (PE), polypropylene (PP), polyvinyl chloride (PVC), polyamide (PA) or mixtures thereof. The foamed polymer further includes hydrous foam cells, and the zeolitic material is at least partially present in dehydrated form. Embodiments disclose a molding compound underlying the molded body, a method for foaming a thermoplastic polymer, and the use of the foamed molded body.

15 Claims, 1 Drawing Sheet

ZEOLITES FOR THERMOPLASTIC FOAM INJECTION MOLDING

CROSS REFERENCE TO RELATED APPLICATION

This application is based upon and claims the benefit of prior German Patent Application No. 10 2015 106 990.3, filed on May 5, 2015, the entire contents of which are incorporated herein by reference.

TECHNICAL FIELD

The present disclosure relates to a foamed, flame-proofed molded body, comprising at least one foamed thermoplastic polymer including a zeolitic material in an amount from 0.1 percent by mass to 2.0 percent by mass, based on the weight of the foamed polymer, as well as to a molding compound underlying the molded body, and to a method for foaming a thermoplastic polymer, and the use of a zeolite as a foaming agent.

BACKGROUND OF THE DISCLOSURE

Components made of plastic material now account for a share between 15 and 20 percent by weight in automobile construction. These components are frequently exterior and interior parts, wherein the corresponding visual, haptic and functional properties are imparted to the latter by adhesively bonding injection molded components with different surface decors. Plastic parts are used as injection-molded bodies for the interior of automobiles, for example instrument panels, door linings or center consoles. These interior parts may be provided with a decor or painted.

Additionally, competition in the automotive industry toward lightweight construction has resulted in applications for plastic materials, wherein physical foaming, such as the substitution of plastic material with a gas (e.g. nitrogen, $CO_2$), or chemical foaming is also increasingly used. In the case of physical foaming using MuCell® or similar methods, nitrogen or carbon dioxide, for example, is injected in a supercritical state into the plastic melt under pressure during plasticizing and homogenously distributed. After injection into the non-pressurized mold, the gas separates from the melt again and forms a fine-celled foam structure. The elimination of dwell pressure, the reduced viscosity, and minimized or eliminated sink marks and warpage are aspects that intensify the trend.

Foamed polymer objects are known in the technical field and have a variety of applications. Foams are used, for example, for cushioning, insulation, weight reduction, impact absorption, and thermal, chemical and electrical inertness. Thermoplastic polymer foams can be produced using foamed beads or conventional polymer processing techniques, such as extrusion, injection molding, reaction injection molding, and mechanical mixing. Foam extrusion typically includes melting the polymer in an extruder, adding a gas or a compound that is present in a gaseous state at the extrusion temperature and at standard pressure (e.g. blowing agent, foaming agent), or a source of a gas, such as a chemical compound, which generates a gas by way of decomposition, and then extruding the molten thermoplastic polymer through a die to form a foamed structure. Frequently, nucleating agents are also added to the molten polymer, so that the pore size and the homogeneity of the resulting foam are improved.

Methods for producing foamed polymer objects were disclosed, for example, in U.S. Pat. No. 5,726,214, U.S. Pat. No. 4,877,815 and U.S. Pat. No. 3,072,583.

JP 08-012796 discloses the use of a combination of boron nitride and a zeolite as nucleating agents in a composition for foaming fluoropolymer resins.

DE 602 19 054 discloses that zeolites can be used alone, without adding a gas or a chemical bathing agent, to foam a thermoplastic, melt-processable fluoropolymer.

However, the foam molded bodies of the prior art include a variety of drawbacks. For example, a special apparatus is needed for injecting the gas when physical foaming is employed. In addition, nucleating agents and further additives (such as flame-proofing agents) must be added to the composition to produce foams having a small cell size, high homogeneity and wide range of applications, making production more expensive and less practical. A further disadvantage of the method of the prior art is that undesirable outgassing behavior of the foamed molded bodies occurs during and/or after production of foams. This delays the production of lined components and makes them more expensive and less practical. Additionally, when a lining is applied early, the outgassing results in disadvantageous blistering. This requires waiting an undesirably long time for the outgassing to subside before a lining can be applied to the molded body.

SUMMARY

Embodiments of the present disclosure provide a foamed molded body in which outgassing may be reduced or suppressed such that the molded body can be provided with a lining or coating immediately after the molded body has been produced. Embodiments of the present disclosure create a molding compound underlying the molded body and a method for foaming a thermoplastic polymer.

Embodiments of the present disclosure provide a foamed, flame-proofed molded body, a molding compound underlying the foamed molded body, a method for foaming a thermoplastic polymer, and the use of a molded body.

The foamed molded body according to the present disclosure comprises at least one foamed thermoplastic polymer including a zeolitic material in an amount from 0.1 percent by mass to 5.0 percent by mass, based on the weight of the foamed polymer, wherein the thermoplastic polymer is selected from the group consisting of acrylonitrile butadiene styrene (ABS), styrene acrylonitrile (SAN), polystyrene (PS), polycarbonate (PC), polyethylene (PE), polypropylene (PP), polyvinyl chloride (PVC), polyamide (PA) or mixtures thereof, and wherein the foamed polymer comprises hydrous foam cells, and the zeolitic material is at least partially present in dehydrated form.

According to an embodiment of the present disclosure, outgassing of a molded body foamed by way of a crystallization water-containing or hydrated zeolitic material may be considerably reduced or suppressed by the generation of hydrous foam cells. The zeolite releases water of crystallization under heating in an extruder [See C. Klein and A. Philpotts, "Earth Materials", Cambridge University Press 2013, pages 386-387 and 461-462, and K. Hefferan and J. O'Brien, "Earth Materials", Wiley-Blackwell 2010, pages 138-140]. The evaporated water of crystallization forms minute gas bubbles, which distribute as foam cells in the molded body. This may improve foaming or the quality of the foamed molded body through homogeneous distribution of hydrous gas bubbles of equal size. The zeolite may also help stabilize the plastic foam after the same has been created. This may take place when the water of crystallization is partially taken up by the zeolite again, after minor cooling of the melt when exposed to ambient air. As a result, the gas pressure in the foam may be reduced, whereby subsequent outgassing of water (which acts as the foaming agent) may be substantially suppressed.

According to an embodiment of the present disclosure, the hydrous foam cells may also impart flame-retarding properties to the molded body based on the water being released from the foam cells at elevated temperatures or in the event of a fire.

According to an embodiment of the present disclosure, hydrated zeolites can be used alone, without the addition of a gas or chemical foaming agent or blowing agent, to foam a thermoplastic, melt-processable polymer. Examples of such polymers include acrylonitrile butadiene styrene (ABS), styrene acrylonitrile (SAN), polystyrene (PS), polycarbonate (PC), polyethylene (PE), polypropylene (PP), polyvinyl chloride (PVC), polyamide (PA) or mixtures thereof used in automotive engineering. The hydrated, hydrous zeolite may be mixed as a foaming agent with the polymer or introduced directly into the melt, and can then foam the polymer to a degree that is dependent on the amount of zeolite present by injection molding or extrusion of the zeolite-containing polymer composition. In addition, the zeolite may be used in combination with typical foaming agents, such as a gas or chemical foaming agent or blowing agent.

The zeolitic material may be present in an amount from 0.5 percent by mass to 1.5 percent by mass based on the polymer weight. This mass distribution ensures that sufficient water is given off for foaming interior components for use in the automotive field, for example, while ensuring a sufficiently low amount of zeolite is present so as not to impair the mechanical properties of the molded part. Moreover, sufficient hydrous foam cells may be formed at this amount of zeolite, which impart flame-retarding properties to the molded body. The desired degree of foaming can be directly controlled by the weighed-out amount of zeolite. At these quantities, the zeolite may also assume the property of a filler.

The zeolitic material may have a mean particle size of no more than 25 µm and/or a pore opening diameter in the range of 0.3 to 1.0 nm. These characteristic material variables may bring about an optimal foaming behavior for the different functions of the zeolite as a nucleating agent, foaming agent and flame-proofing agent.

Na-A zeolite (SYLOSIV A4®, pore size 0.4 nm), ZSM-5 zeolite (silicalite, pore size 0.5 nm) or A 4 zeolite (Zeopor® K80, clinoptilolite, pore size 0.4 nm) can be efficient molecular sieves. The water in zeolite A is present in what are known as sodalite and alpha cages. The water molecules therein can move relatively freely, but interact strongly with the cations and the anionic zeolite lattice. The vapor pressure of the water in the zeolite is therefore considerably lower than that of free water. The water may be removed from the zeolite by heating or underpressure, without changing or destroying the lattice structure thereof.

The zeolitic material in the foamed molded body may have a water content of less than 5 percent by mass. The water escaping from a molding compound during the thermal treatment by corresponding heating at elevated pressure may be removed completely from the zeolite so as to form a sufficient number of foam cells. Zeolites have widemeshed crystal frameworks in which cavities and channels of various cations and water molecules are bound to a particular site without fixation. Water, known as zeolite water, may therefore be continuously given off and taken up again without resulting in changes to the crystal structure. For example, stilbite $NaCa_2[Al_5Si_{13}O_{36}]$ 14 $H_2O$ contains approximately 20 percent by weight water prior heating, natrolite $Na_2[Al_2Si_3O_{10}]$ 2 $H_2O$ contains approximately 10 percent by weight water prior to heating.

The foamed polymer may comprise hydrous foam cells having an average size of 25 to 100 µm in the molded body. The individual foam cells of the molded body may have a mean diameter of no more than 100 µm, which may increase the quality of the molded body. The zeolite in a small particle size may be used simultaneously as a nucleating agent and as a blowing agent to achieve a mean diameter. Adding the zeolite may accelerate cell growth, whereby polymer foam cells having the desired mean diameter may be obtained.

The zeolitic material may be selected from the group consisting of zeolite Y, zeolite X, zeolite A, zeolite ZSM-5, and zeolite beta. These zeolite materials have water contents that can be continuously controlled thermally and/or by pressure.

By virtue of their chemical composition, many plastic materials are easily flammable. To achieve the high flame-proofing requirements demanded by automakers or aircraft manufacturers, plastic materials must generally include flame-proofing agents. In some embodiments, the molded body may have a flammability rating of V-0. The V-0 fire rating may be achieved by using hydrated zeolite as a blowing agent and flame-proofing agent for producing the foamed molded body. Meeting the V-0 fire rating requires that burning must stop within 10 seconds, total burning time must not exceed 50 seconds for 10 flame applications, no burning drips, specimens must not be completely burned, and no afterglow of the specimens persists for more than 30 seconds after the flame has been removed.

According to an embodiment of the present disclosure, the molding compound for producing a foamed, flame-proofed molded body comprises at least one foamable thermoplastic polymer including a foaming agent made of zeolitic material in an amount from at least 0.1 percent by mass to 2.0 percent by mass, based on the weight of the polymer, wherein the thermoplastic polymer is selected from the group consisting of acrylonitrile butadiene styrene (ABS), styrene acrylonitrile (SAN), polystyrene (PS), polycarbonate (PC), polyethylene (PE), polypropylene (PP), polyamide (PA) or mixtures thereof, and the zeolitic material is present in hydrated form. The thermoplastic material may be present in fiber-reinforced or unreinforced form.

The zeolitic material may be selected from the group consisting of zeolite Y, zeolite X, zeolite A, zeolite ZSM-5, and zeolite beta. The general composition of the substance group of zeolites is $M_{x/n}[(AlO_2)_x(SiO_2)_y]$ z $H_2O$, so that practically all zeolites store water due to the structure thereof, which can be given off again when heated. The selection involves commercially available, easily accessible, inexpensive zeolite materials having water contents that can be continuously controlled thermally.

According to an embodiment of the present disclosure, the method for foaming a thermoplastic polymer, which is selected from the group consisting of acrylonitrile butadiene styrene (ABS), styrene acrylonitrile (SAN), polystyrene (PS), polycarbonate (PC), polyethylene (PE), polypropylene (PP), polyimide (PA) or mixtures thereof, comprises the steps of providing a molding compound containing the polymer and at least one zeolitic material in hydrated form, and thermally treating the molding compound at temperatures that exceed the boiling point of $H_2O$.

In some embodiments, the foaming of the polymer can be carried out in a conventional extrusion device or in an injection mold, for example. A foamed, flame-proofed polymer produced by the method according to the present disclosure may also be introduced again into the extrusion device or the injection mold, and foams without the addition of new or additional zeolite. This method may additionally enable all waste of the foamed object to be recycled and used again to produce foamed objects.

In some embodiments, providing the molding compound may include the homogeneous mixing of the thermoplastic material with the zeolitic material, and the thermal treatment may include the melting of the molding compound using pressure and heat; the extruding of the homogenized melt or the injection molding in an injection mold; cooling; applying a decorative layer, or bonding the molded body to a further component during or immediately after the foamed molded body has cooled. By evenly distributing the zeolite in the volume of the molded body, foaming gases may be given off evenly.

The extruding or injection molding of the molding compound may be carried out at a temperature in the range of 100 to 300° C.

According to the present disclosure, the use of a foamed, flame-proofed molded body, or of a molding compound for producing a foamed, flame-retardant component, comprises a coated car-, aircraft- or ship fitting serving as the component, or a part of a car-, aircraft- or ship fitting, and a coated or lined interior component.

According to the present disclosure, the use of a zeolite may include a hydrated zeolite as the foaming agent and flame-proofing agent for a foamable thermoplastic polymer, which may be selected from the group consisting of acrylonitrile butadiene styrene (ABS), styrene acrylonitrile (SAN), polystyrene (PS), polycarbonate (PC), polyethylene (PE), polypropylene (PP), polyvinyl chloride (PVC), polyamide (PA) or mixtures thereof.

The foamed, flame proofed molded body may additionally comprise a coating, such as a decorative layer. Blowing agent bubbles may no longer be apparent under a leather decor or a film immediately after the leather decor or the film has been applied to a molded body that was removed from the injection mold or extruder. The hydrous foam cells generated by using zeolite may prevent undesirable outgassing behavior during and/or after the production of foams by way of $N_2$ or $CO_2$, which delays the production of lined components.

DETAILED DESCRIPTION

Embodiments of the present disclosure will be described in more detail hereafter based on several examples.

Example 1

A sample of the natural zeolite Zeopur K80 was heated to 80° C. over a period of 3 hours in a drying furnace. Thereafter, a loss in weight from water of more than 3.1% percent was established.

This example shows that the crystal structure of the zeolites has cavities in the form of cages or channels (shown in FIG. 2), in which normally water is intercalated, in addition to cations, which can be reversibly removed from the cavities by heating.

Example 2

A decorative film is applied to an injection-molded foam molded body according to the present disclosure, which was produced without additional foaming agent, but using a hydrous zeolite, immediately after the molded body was removed (mold trial) from the injection mold. Outgassing of the molding compound, or of the molded body produced therefrom, may be considerably reduced or entirely suppressed after a foaming process with the aid of the hydrous zeolite.

Figure 1:
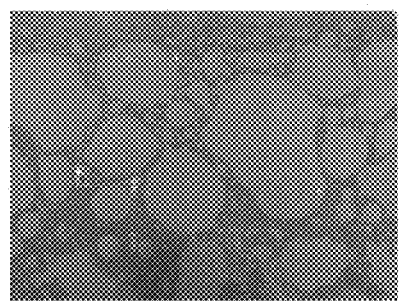
FIG. 1 shows a photograph of an injection-molded body from the prior art.

FIG. 1 shows a photograph of an injection-molded body from the prior art, foamed conventionally by way of $N_2$ without using a hydrous zeolite, comprising a decorative layer, which was applied 3.5 hours after the molded body was removed from the injection mold. Strong blistering as a result of the outgassing of $N_2$, apparent from the dark areas, is clearly shown in FIG. 1. Depending on the plastic material that is used, this decorative layer is very difficult to apply without blistering until at least approximately 44 hours after the molded body is removed from the injection mold. As a result, it was previously necessary to wait an undesirably long time for the outgassing to subside before a lining could be applied to the molded body.

Figure 2:
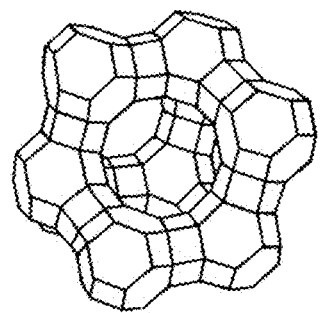
FIG. 2 shows the cavity structure of zeolite A.

FIG. 2, by way of example, shows the cavity structure of zeolite A, a synthetic, colorless, crystalline aluminosilicate, which in the hydrated sodium form thereof has the empirical formula $Na_{12}((AlO_2)_{12}(SiO_2)_{12})$ 27 $H_2O$. The collective term zeolite A covers different variants of this compound. A suitable molecular sieve in the present disclosure may be a zeolite A having a pore opening diameter in the range of 0.3 to 0.5 nm.

The invention claimed is:

1. A foamed, flame-proofed molded body, comprising:
   at least one foamed thermoplastic polymer including a zeolitic material in an amount from 0.1 percent by mass to 5.0 percent by mass, based on the weight of the foamed polymer,
   wherein:
   the thermoplastic polymer is selected from the group consisting of acrylonitrile butadiene styrene (ABS), styrene acrylonitrile (SAN), polystyrene (PS), polycarbonate (PC), polyethylene (PE), polypropylene (PP), polyvinyl chloride (PVC), polyamide (PA) or mixtures thereof,
   the foamed polymer includes hydrous foam cells, and
   the zeolitic material is at least partially present in dehydrated form, and has a water content of less than 5 percent by mass.

2. The molded body according to claim 1, wherein the zeolitic material is present in an amount from 0.5 percent by mass to 1.5 percent by mass based on the polymer weight.

3. The molded body according to claim 1, wherein the zeolitic material has a mean particle size of no more than 25 µm.

4. The molded body according to claim 1, wherein the zeolitic material has a pore opening diameter in the range of 0.3 to 1.0 nm.

5. The molded body according to claim 1, wherein the foamed polymer comprises hydrous foam cells having a mean size of 25 to 100 µm.

6. The molded body according to claim 1, wherein the zeolitic material is selected from the group consisting of zeolite Y, zeolite X, zeolite A, zeolite ZSM-5, and zeolite beta.

7. The molded body according to claim 1, wherein the molded body has a flammability rating of V-0.

8. A method for foaming a thermoplastic polymer, the method comprising:
providing a molding compound containing a mixture of the thermoplastic polymer and a zeolitic material in hydrated form;
thermally treating the molding compound at temperatures that exceed the boiling point of $H_2O$; and
cooling the thermally-treated molding compound to thereby form a foamed molded body,
wherein:
the zeolitic material in the foamed molded body has a water content less than 5 percent by mass,
the foamed molded body includes hydrous foam cells, and
the thermoplastic polymer is selected from the group consisting of acrylonitrile butadiene styrene (ABS), styrene acrylonitrile (SAN), polystyrene (PS), polycarbonate (PC), polyethylene (PE), polypropylene (PP), polyvinyl chloride (PVC), polyamide (PA) or mixtures thereof.

9. The method according to claim 8, further comprising:
providing a molding compound includes homogeneously mixing the thermoplastic polymer with the zeolitic material, and
thermally treating the molding compound includes melting the molding compound using pressure and heat.

10. The method according to claim 9, further comprising:
at least one of:
extruding the homogenized melt from an extrusion device, or
injection molding the homogenized melt in an injection mold;
cooling the foamed molded body; and
at least one of applying a layer to the foamed molded body or bonding the foamed molded body to another component during or after cooling.

11. The method according to claim 8, wherein the at least one of extruding the homogenized melt from an extrusion device or injection molding the homogenized melt in an injection mold is carried out at a temperature in the range of 100 to 300° C.

12. The molded body according to claim 1, wherein the foamed, flame-proofed molded body is used to produce a flame-retardant component.

13. The molded body according to claim 12, wherein the flame-retardant component is a coated or lined component of a vehicle interior.

14. The method according to claim 8, wherein the foamed thermoplastic polymer is formed to produce a flame-retardant component.

15. The molded body according to claim 13, wherein the flame-retardant component is a coated or lined component of a vehicle interior.

* * * * *